Oct. 13, 1936.    G. L. TINKHAM    2,057,457
METHOD OF MAKING EXPANSION JOINTS FOR ICE TRAYS
Original Filed March 10, 1934    5 Sheets-Sheet 1
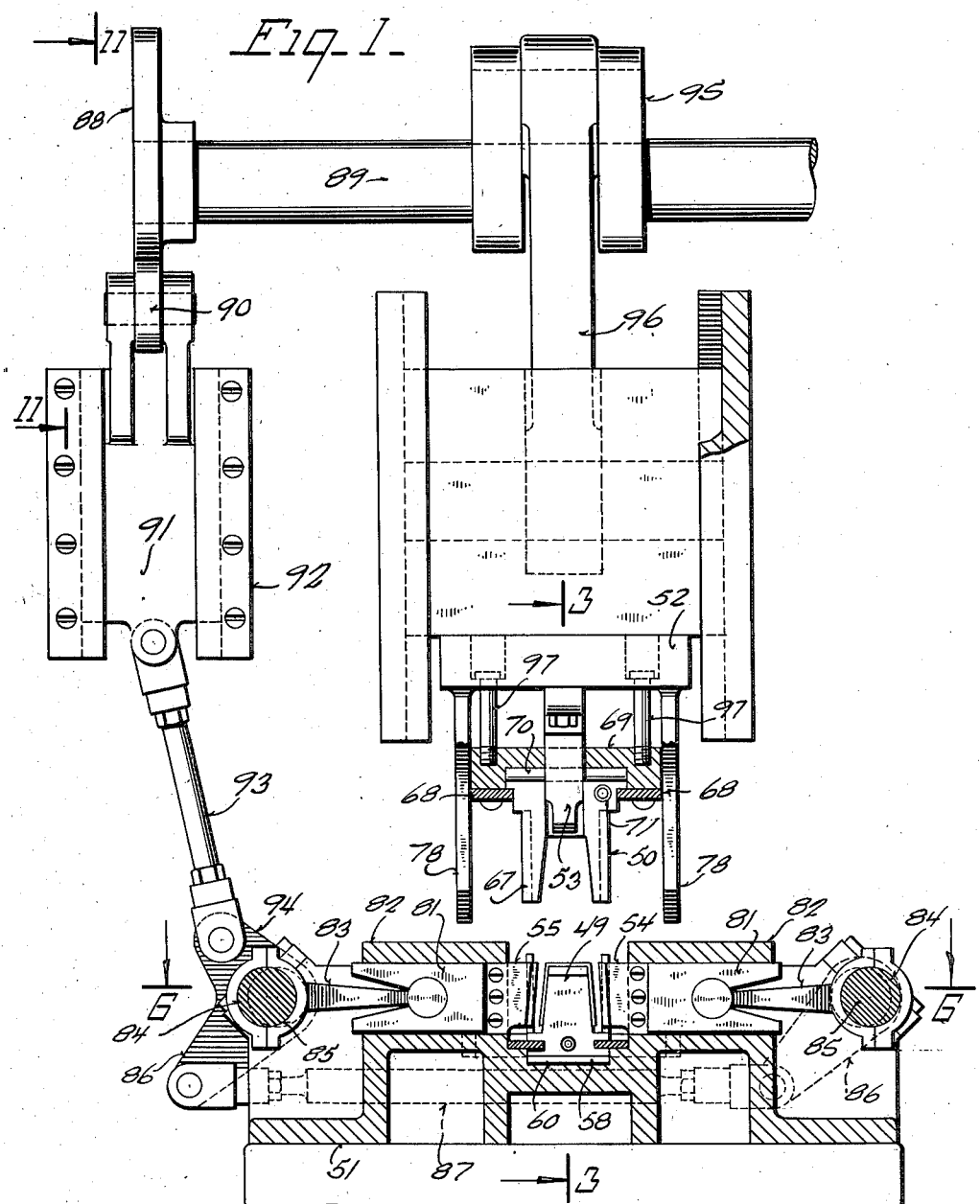
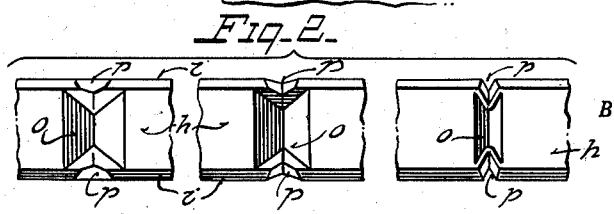
INVENTOR.
Guy L. Tinkham
BY
ATTORNEYS Oct. 13, 1936. G. L. TINKHAM 2,057,457
METHOD OF MAKING EXPANSION JOINTS FOR ICE TRAYS
Original Filed March 10, 1934 5 Sheets-Sheet 2
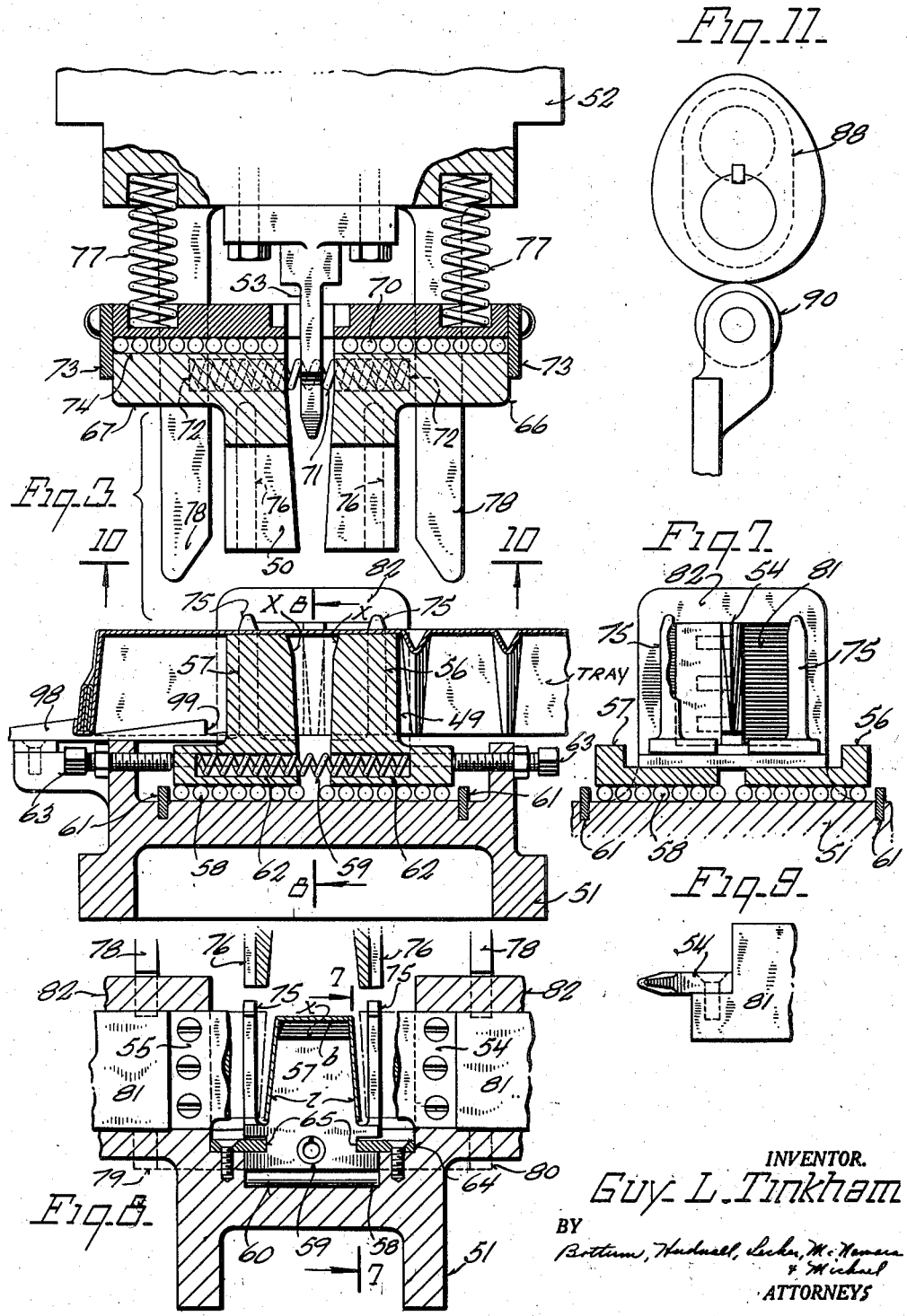
INVENTOR.
Guy L. Tinkham
BY
ATTORNEYS

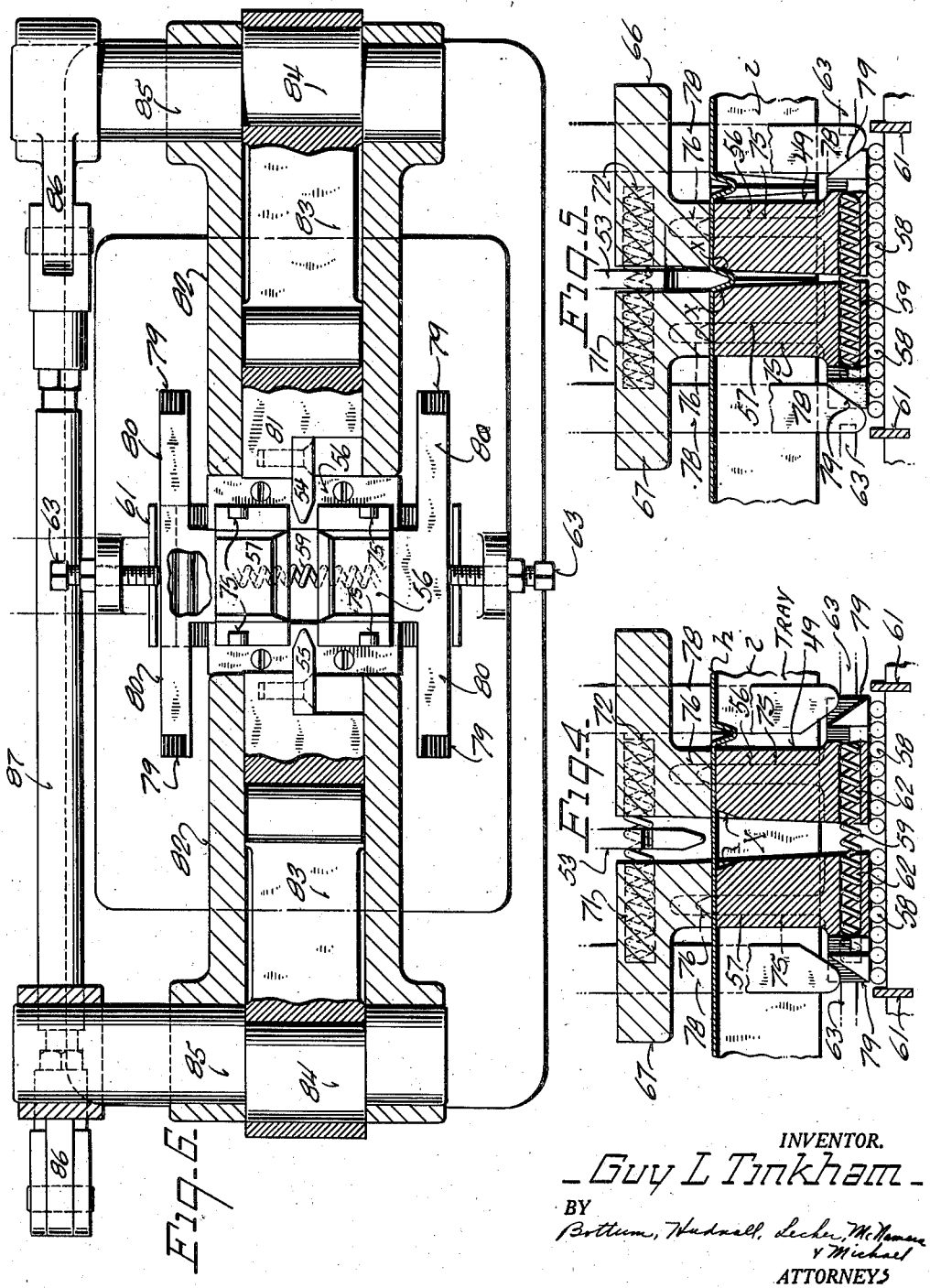

Oct. 13, 1936.   G. L. TINKHAM   2,057,457
METHOD OF MAKING EXPANSION JOINTS FOR ICE TRAYS
Original Filed March 10, 1934   5 Sheets-Sheet 4
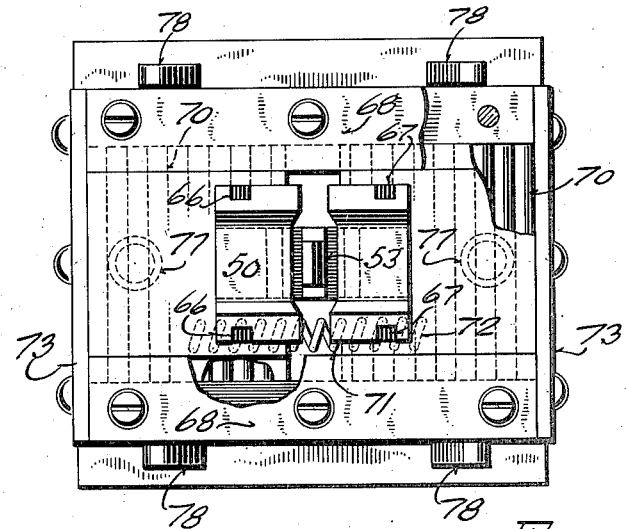
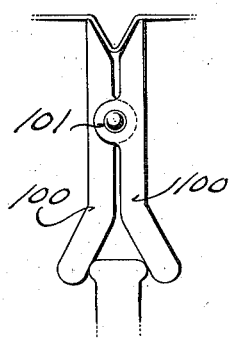
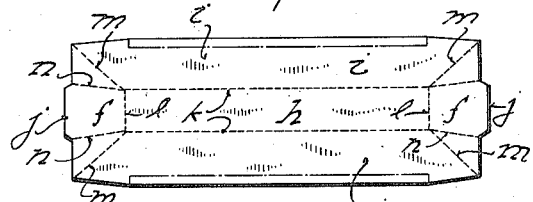
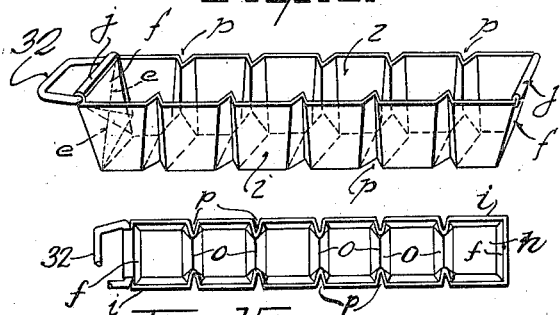
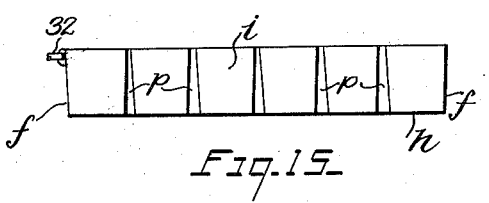
INVENTOR.
Guy L. Tinkham
BY
ATTORNEYS Oct. 13, 1936.    G. L. TINKHAM    2,057,457
METHOD OF MAKING EXPANSION JOINTS FOR ICE TRAYS
Original Filed March 10, 1934    5 Sheets-Sheet 5

INVENTOR.
Guy L. Tinkham
BY
ATTORNEY.

Patented Oct. 13, 1936

2,057,457

UNITED STATES PATENT OFFICE 2,057,457

METHOD OF MAKING EXPANSION JOINTS FOR ICE TRAYS

Guy L. Tinkham, Detroit, Mich., assignor, by mesne assignments, to The Inland Manufacturing Company Original application March 10, 1934, Serial No. 714,908, now Patent No. 2,021,118, dated November 12, 1935. Divided and this application August 30, 1934, Serial No. 742,038

9 Claims. (Cl. 113—120)

This invention has reference to flexible metal ice trays of the character covered by my Patent No. 1,894,897, granted January 17, 1933 and co-pending applications, Serial Nos. 645,215, filed December 1, 1932, and 686,328, filed August 23, 1933, the latter being a division of the first named application.

The present application relates to a method for producing expansion joints in the bottom and the side walls in such trays at spaced intervals along the length of the same and is a division of my co-pending application Serial No. 714,908, filed March 10, 1934.

The general purpose and object of the present invention is to provide a method for producing these expansion joints in the tray walls without undue stretching or elongation of the metal in forming the joints.

A further object of the invention is to so control the action or movement of the joint forming elements with respect to each other that the metal of the tray walls where the joints are formed will fold easily and naturally without placing any undue strain on the metal to impair the flexibility of the completed tray.

Other and further objects of the invention will appear from the following specification taken in conjunction with the accompanying drawings in which:—

Fig. 1 is an end view with parts in section of the apparatus for forming the expansion joints in the tray in accordance with the method of my invention;

Fig. 2 shows the development of a set of the joints;

Fig. 3 is an enlarged vertical sectional view taken on line 3—3 of Fig. 1;

Figs. 4 and 5 are vertical sectional views with parts in elevation showing the action of the joint forming mechanism;

Fig. 6 is a horizontal sectional view with parts in elevation taken on line 6—6 of Fig. 1;

Fig. 7 is a vertical sectional view with parts in elevation taken on line 7—7 of Fig. 8;

Fig. 8 is a similar sectional view taken on line 8—8 of Fig. 3;

Fig. 9 is a top plan view of one of the side tools and its support;

Fig. 10 is a bottom plan view with parts broken away of the upper member of the joint producing mechanism as shown in Fig. 1, Fig. 10 being taken on line 10—10 of Fig. 3;

Fig. 11 shows the cam and co-operating roller of the joint forming apparatus;

Fig. 12 is a plan view of the flat metal blank from which the tray is produced;

Fig. 13 is a perspective view of the completed tray provided with the expansion joints in accordance with my herein described method;

Fig. 14 illustrates more or less diagrammatically means for setting the expansion joints after being made;

Figs. 15 and 16 are side and top plan views, respectively, of the completed tray;

Figure 17:
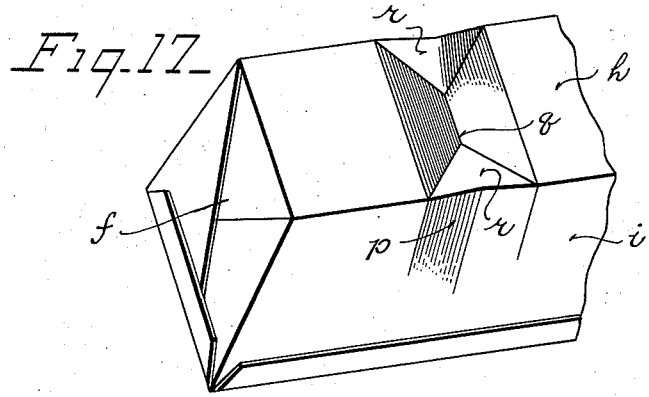
Figs. 17 to 20 are fragmentary perspective views illustrating the manner in which the metal folds in producing a set of joints in the walls of the tray, said figures being further illustrative of the development shown in Fig. 2.

The tray shown in Fig. 13 without the expansion joints is produced by folding the flat blank of Fig. 12 into tray form. The blank is preferably of flexible sheet metal of the gauge and material required for a flexible metal ice tray. The apparatus and method for folding the tray is covered by my application Serial No. 735,362, filed July 16, 1934, as a division of application Serial No. 714,908, aforesaid. I need not enter here into a detailed description of the manner and means employed for folding the blank into tray form except to state generally that the section $h$ of the blank which constitutes the bottom wall of the tray is clamped between the members of the folding device whereupon the portions $f$ and $i$ of the blank are folded upwardly with respect to the bottom wall $h$ to provide the end and the side walls of the tray which are correspondingly marked in Fig. 13. The blank is in one integral piece as shown in Fig. 12 and when folded into tray form produces extensions at the ends of the side walls of the tray. These extensions fold on themselves along the lines $m$, $m$. The extensions after the tray has been folded are bent inwardly toward each other to overlap the end walls $f$ on the exterior of the tray as indicated in the dotted lines in Fig. 13 at one end of the tray. These extensions are marked $e$ in this figure and they are secured to the end walls $f$ by marginal flanges $j$ integral with the upper edges of said end walls. The flanges are folded over the extensions as shown in Fig. 13. A handle member, marked 32, may be connected to the tray at one end by the associated flange $j$ as shown in Fig. 13. This handle member and its method of attachment to the tray is covered by my application Serial No.

733,726, filed July 5, 1934, also a division of application Serial No. 714,908, aforesaid.

After the tray has been formed, it is subjected to a joint forming apparatus for producing expansion joints in its bottom and side walls as shown in Fig. 13. The apparatus employed comprises a block 49 and a pressure pad 50 and a set of joint forming instrumentalities or tools co-operating therewith. The block 49 is mounted on the base 51 of the machine and the pressure pad is carried by the ram 52. The forming tools are indicated by 53, 54, and 55. Tool 53 is carried by the ram 52 and is designed to form the expansion joint o in the bottom wall h of the tray as indicated in Fig. 2. The tools 54 and 55 are arranged on opposite sides of the block 49 and are designed to form the joints p in the side walls of the tray as shown in Figs. 2 and 13. These joints are formed by pressing the metal of the tray walls into the tray at predetermined spaced points along the length of the tray as shown. The joints are V-shape in section, thus having diverging walls permitting the metal tray to be flexed laterally in the direction of its length to fracture the mass frozen in the tray and break the mass into smaller sections along the scored lines produced in the mass by the inwardly extending portions of the joints. The joints in the side walls of the tray extend through the upper edges of the tray whereby the tray may be flexed.

The block 49 and the pad 50 are brought together with the tray between them to clamp and hold the tray in position for the forming tools to operate upon it. The block and the pad are in sectional form, the parts being so arranged and constructed that the sections of each member are capable of relative movement toward each other to respond to the force exerted on the metal of the tray by the forming tools in producing the joints. Thus the metal walls of the tray are not stretched or unduly strained in the forming of the joints and the inherent flexibility of the metal of which the tray is made is retained to prolong the life of the tray as it is flexed in use.

The block 49 fits within and supports the tray, the latter being placed in an inverted position over the block as shown in the drawings. The sections 56 and 57 of the block are mounted on rollers 58 and are normally urged apart by one or more interposed coil springs 59 as shown in Figs. 3 to 6. The rollers fit in a channel 60 in the portion of the machine base beneath the block and are confined in place by upright stops 61, 61 at the ends of the channel as shown in these figures. The spring 59 fits in recesses 62 bored in the sections of the block as shown. Set screws 63 mounted in the base of the machine on opposite sides of the block limit the outward movement of the block sections by the spring. The metal of the tray is forced into the space between the sections 56, 57 of the block in forming the expansion joints and the upper edge portions of these sections at this space are outwardly inclined as at x to conform to the tapered shape of the operating end of the top tool 53 and thus permit the making of the top joint in V-shape form as shown in Fig. 5. The block sections 56, 57 are held in place against the rollers 58 by plates 64 secured to the base of the machine and extending into grooves or channels 65 in the block sections at the sides thereof as shown in Fig. 8.

The sections 66, 67 of the pressure pad 50 are secured by strips 68 to under side of a carrying plate 69. Rollers 70 are interposed between the sections of the pad and the carrying plate 69 to allow for ease of movement of the pad sections toward and from each other in the operation of the machine. These sections are normally urged apart by an interposed coil spring 71 fitting in aligned recesses 72 bored or otherwise provided in the pad sections. Outward movement of the pad sections is limited by stops 73, 73 secured to the plate 69 at the opposite sides of the pressure pad. These stops also close the space or channel 74 provided in the plate for the rollers. The pad sections have movement in the same direction as the block sections, thus locating the strips 68 at the sides of the pad sections and in parallelism to the holding plates 64 for the block sections.

The forming tool 53 operates in the space between the pad sections as shown. These sections are formed to fit over the outer side of the portion of the tray supported by the block sections and have horizontal top and inclined side walls to engage the corresponding portions of the tray to clamp the tray between the pad and the block during the operation of the machine. The pad is brought into proper register with the block by guide rods 75 extending upwardly from the block sections and entering channels or grooves 76 in the pad sections as indicated in Fig. 8. These guide rods are on the outer sides of the block sections and do not interfere with the placing of the tray thereon. The rods not only hold the pad central with respect to the block, but also guide the pad in its vertical movement with respect to the block. The construction referred to is at the sides of the sections and does not hinder the movement of the sections toward and from each other.

Coil springs 77, 77 are interposed between the pad and the ram and serve as a resilient support for the pad, enabling it to be pressed against the tray on the block and also enabling the ram to continue its downward movement to force the forming tool 53 against the bottom wall of the tray. The ends of these springs 77 seat in recesses in the plate 69 and the ram 52, respectively, as shown in Fig. 3.

Depending from the ram on opposite sides of the pad are rigid arms 78, 78 having beveled or inclined lower ends to co-operate with like surfaces 79 at the outer ends of horizontal extensions 80 on the block sections 56, 57 as shown in Figs. 4 and 6. These parts engage in the descent of the pad over the block to initiate the movement of the block sections toward each other in timed relation with the descent of the forming tool 53 to avoid stretching the metal of the tray in the forming of an expansion joint in its bottom wall.

The side tools 54, 55 are secured to slides 81, 81 mounted in suitable guides 82 on the base portion of the machine on opposite sides of the block 49. Links 83, 83 connect the slides with eccentrics 84, 84 on rock shafts 85, 85 journaled in the base of the machine on opposite sides of the block as shown in Figs. 1 and 6. These shafts have rock arms 86, 86 connected by an adjustable link 87 for movement in unison from the controlling cam 88 on the power operated crank shaft 89 of the machine. Cam 88 functions against a roller 90 carried by slide 91 operating in guides 92 as shown in Fig. 1. An adjustable link 93 connects the slide 91 with a rock arm 94 on one of the rock shafts 85 for imparting motion to both shafts in operation of the main cam 88. The ram 52 is connected with a crank 95 on the shaft 89 by a pitman 96 as shown. Guide rods 97 hold the pressure pad in central relation with the ram.

In forming the joints in the tray the top tool 53 is brought into operation in advance of the side tools and at no time does the top tool travel at the same speed as the side tools, rather the travel of the side tools is accelerated for the latter part of their operation. The variation of travel is taken care of by the shape of the cam 88 and its position on the crank shaft 89 relatively to the pin of the crank 95. The operating end portion of the top tool has a length less than the width of the bottom of the tray as shown in Fig. 1, and engages the bottom wall intermediate the side walls of the tray in forming a joint in the bottom wall. Thus sufficient clearance is allowed at the sides of the top tool for the metal of the bottom wall beyond said side edges to fold naturally and easily as the side tools form the joints in the side walls of the tray. This surplus metal follows the side tools as they are forced against the tray walls and enable the joints in the side walls to extend completely across the same as shown. The operating end portions of the side tools are as wide as the side walls of the tray and are tapered similarly to the top tool as shown in Fig. 9. The development of a set of joints is shown in Fig. 2. The view at the left end of this figure shows the joint started in the bottom wall. The bottom wall has been indented considerably by the top tool. The side tools have just started the joints in the side walls indenting said side walls slightly as shown. The central view shows the joints further advanced and the view at the right shows the joints completely formed. When the top tool completes its joint, the speed of the side tools is then increased to complete the forming of their joints.

The joints in the tray are spaced apart along the length of the tray to divide it into the desired number of cube forming sections or cells. The joints in one side wall are opposite those of the other side wall and connect with the corresponding joints in the bottom wall. This as stated, divides the tray into a series of connected cells or compartments of the size required for the individual cubes to be produced. These joints are not produced all at the same time, each cube separation being produced individually. The tray is moved manually with respect to the joint producing mechanism, there being a suitable stop arrangement to enable a tray to be set at the proper points for the joints to be formed. This stop comprises a bar 98 extending outwardly from one of the block sections in line with the feed of the tray through the machine as shown in Fig. 3. This bar has its upper side formed to provide notches 99 spaced along the length of the bar in conformity with the spacing required for the cube forming sections of the tray. Moreover, the block 49 is so designed that it conforms to the dimension of the individual cube sections. The operator in producing the joints of the tray places the tray in an inverted position over the block 49 when the pressure pad 50 is in elevated position above the same as shown in Fig. 1. One end of the tray is adjusted against the notch 99 nearest the block, whereupon the machine is set in operation to produce the first joint section. After that joint has been formed, the tray is then adjusted lengthwise by the operator to contact with the next following stop or notch 99 on the bar 98 and the operation of the machine is repeated to produce the next following joint. This is followed throughout the entire length of the tray until all the joints have been produced.

After the tray has been run through the joint forming mechanism, the walls of the joints are brought closer together to restrict somewhat or control the flexibility of the tray. This is accomplished by subjecting each joint to a squeezing action as indicated in Fig. 14. The joint is inserted between the operative ends of a pair of members 100, 100 fulcrumed together at 101 and so constructed that they act as pliers to bring the walls of the expansion joint in closer relation than as originally produced.

The joint forming mechanism shown and described enables the joints to be produced without undue stretching or elongation of the metal of the tray to weaken or impair its flexibility. Also this mechanism enables trays of different lengths to be operated upon without changing or adjusting the joint forming structure. It will be observed that in as much as the sections of the pad and the block are movable toward each other in the formation of the joints that the tray walls may be moved in response to the force applied to form the joints, thus avoiding undue stretching of or strain on the metal of the tray. This in conjunction with the folding method of producing the tray retains the inherent flexibility of the flexible sheet metal selected for the tray. Thus the life of the tray is prolonged under the repeated flexings when in use.

Figure 18:
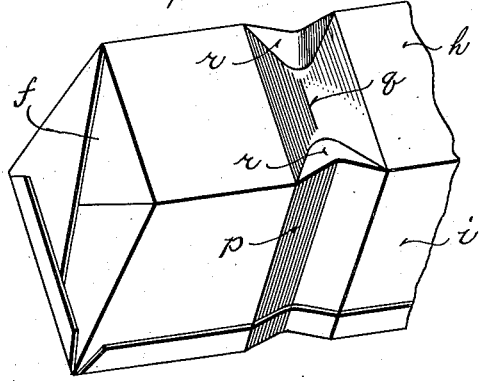
Figure 19:
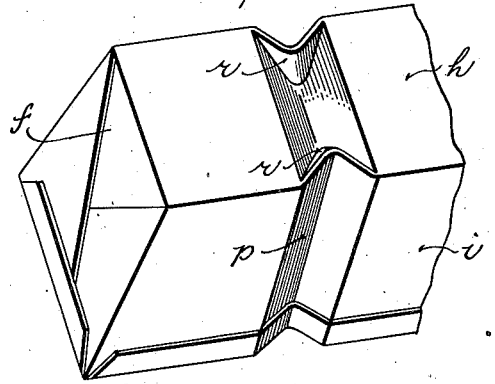
Figure 20:
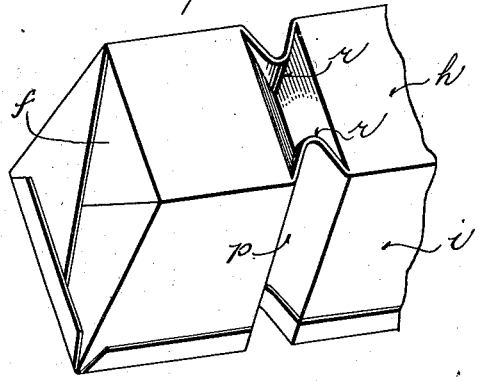
Figure 21:
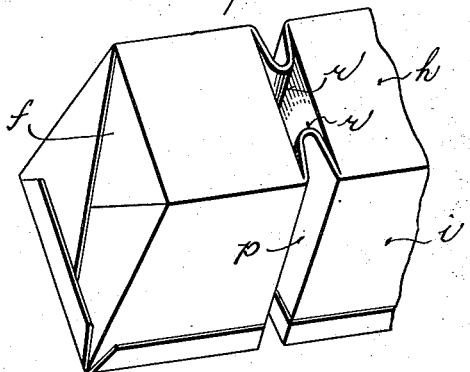
Fig. 21 is a similar perspective view showing the joints in their final form after the tray has been completed.

In further explanation of how the metal folds in forming a set of joints in the tray walls, attention is directed to Figs. 17 to 21. As heretofore stated, the top tool 53 is forced against the bottom wall $h$ of the tray slightly in advance of the contact of the side tools 54, 55 with the side walls $i$ of the tray. The top tool 53 indents the portion of the bottom wall $h$ engaged by and on opposite sides of said tool into the space between the upper ends of the block sections 57, 56 while the latter are at their maximum spacing as shown in Fig. 4. The nature of and extent to which the bottom wall $h$ is pressed inwardly or indented at this time is indicated in Fig 17. The extent of the contact of the top tool with the bottom wall of the tray is indicated by the line $q$. This line terminates short of the side walls $i$ of the tray and the intervening portions $r, r$ of the bottom wall $h$ are free of the top tool to fold inwardly on themselves in response to the action of the side tools 54, 55 in forming the expansion joints in the side walls $i$. The side tools are forced against the side walls $i$ in line with the top tool and indent the side walls into the space between the block sections 57, 56 as the top tool continues its joint forming action on the bottom wall of the tray. The side tools contact the full width of the side walls $i$ and fold the portions $r$ inwardly on themselves to conform them to the divergent shape of the joints produced in the side walls of the tray. The starting of the joints in the side walls by the side tools is indicated in Fig. 18. At this time the portions $r$ are initially indented. In the next step, as shown in Fig. 19, the tray walls are further indented by the respective tools, all of which are acting simultaneously, and the inner and outer sections of each portion $r$ are brought closer to overlapping relation which is the condition in the completed joint structure. The tools continue their action on the tray until the joint structure is completed, as shown in Fig. 20, whereupon the tools are withdrawn from the tray. It will be noted from Fig. 20 that the joints in the tray walls extend into the tray in divergent relation, and that the portions r are folded on themselves with their inner and outer sections in contact and conforming to the joints in the side walls of the tray. These portions being free of the top tool allow the metal to fold easily and naturally in response to pressure applied by the side tools and continue the joints in the side walls across the joint in the bottom wall. With the sections of the block and pressure pad of the joint forming machine free to move toward each other, as the metal of the tray is forced into the space between the block sections, the joints are formed without undue straining or stretching of the metal of the tray. The finished joint is shown in Fig. 21, which illustrates the structure following the action of the squeezers of Fig. 14. The folded edges of the portions r remain in the plane of the bottom wall of the tray as shown.

I do not wish to be limited to the particular method shown and described for forming the expansion joints herein referred to, except as pointed out in the appended claims.

I claim as my invention:

1. The method of producing a flexible metal ice tray, consisting in forming the body of the tray by a folding operation from a substantially flat sheet metal blank to provide the tray with integrally connected bottom, side and end walls with the ends of the side walls in folded relation and extending beyond the end walls, then folding over the end extensions of the tray to overlapping relation with each other and the end walls and clamping the overlapping parts into substantially tight contact, and thereafter subjecting the bottom and the side walls of the tray to a joint forming operation by forcing the metal of the tray walls into the tray at the places for the joints into substantially V-shaped configuration to provide expansion joints extending across the bottom and the side walls and through the outer edges of the latter.

2. The method of producing a flexible sheet metal ice tray, consisting in forming the body of the tray by a folding operation from a substantially flat sheet metal blank to provide the tray with integrally connected bottom, side and end walls with the ends of the side walls in folded relation and extending beyond the end walls and with flanges on the upper edges of the end walls, then folding over the extensions at the ends of the tray into overlapping relation with each other and with the end walls, then bending the flanges over the overlapped extensions to hold them against the end walls, and thereafter forming expansion joints in the bottom and side walls of the tray by forcing the portions of the tray walls at the joints into the tray in substantially V-shaped configuration to provide the joints extending across the bottom and the side walls and through the outer edges of the latter.

3. The method of forming a flexible metal ice tray, consisting in forming the body of the tray by a folding operation from a substantially flat sheet metal blank to provide the tray with connected bottom, side and end walls, with the ends of the side walls in folded relation and extending beyond the end walls and with flanges along the upper edges of said end walls, then folding the extensions against the end walls in overlapping relation, then bending the flange at one end of the tray over the overlapped extensions at that end of the tray, then bending the flange at the other end of the tray into overlapping relation with the extensions at such end of the tray and at the same time having such flange secure a bail-like handle member to that end of the tray, and thereafter forming expansion joints in the bottom and the side walls of the tray in spaced relation along the tray walls whereby the tray may be flexed at the joints.

4. The method of forming a set of aligned expansion joints in the bottom and the side walls of a preformed sheet metal tray, consisting in displacing into the tray in substantially channel-shaped form opposed portions of the side walls and the intervening portion of the bottom wall and allowing the ends of the intervening portion to fold in response to the formation of the joints in the side walls to extend said joints completely across said side walls and through the upper and the lower edges thereof.

5. The method of forming a set of aligned expansion joints in the bottom and the side walls of a preformed sheet metal tray, consisting in displacing into the tray in substantially channel-shaped form opposed portions of the side walls and the intervening portion of the bottom wall to an extent less than the width of the bottom wall, whereby the ends of said intervening portion are free to fold in response to the formation of the joints in the side walls to extend said joints across the side walls and through the upper and the lower edges thereof.

6. The method of forming a set of aligned expansion joints in the bottom and the side walls of a preformed sheet metal tray, consisting in clamping the tray walls on opposite sides of the portions in which the joints are to be formed, then forming the joints by displacing into the tray between the clamping means and in substantially channel-shaped form, the opposed portions of the side walls and the intervening portion of the bottom wall to an extent less than the width of the bottom wall whereby the ends of said intervening portion are free to fold in response to the formation of the joints in the side walls to extend said joints through the upper and the lower edges of said side walls, and allowing the clamped portions of the tray walls to move toward each other in response to the formation of the joints to avoid undue stretching of the sheet metal as the joints are formed.

7. The method of forming a set of aligned expansion joints in the bottom and the side walls of a preformed sheet metal tray, consisting in displacing into the tray in substantially channel-shaped form opposed portions of the side walls and the intervening portion of the bottom wall to an extent less than the width of the bottom wall, whereby the ends of said intervening portion are free to fold in response to the formation of the joints in the side walls to extend said joints across said side walls and through the upper and the lower edges thereof, the joint in the bottom wall being started in advance of the formation of the joints in the side walls to initially conform the ends of the intervening portion of the bottom wall to the general contour of the joints in the side walls.

8. The method of forming a set of aligned expansion joints in the bottom and the side walls of a sheet metal tray, consisting in displacing into the tray in substantially V-shaped form opposed portions of the side walls and the intervening portion of the bottom wall to an extent less than the width of the bottom wall, whereby the ends of said intervening portion are free to fold into the space afforded by the joint in the bottom wall in response to the formation of the joints in the side walls to extend the joints in the side walls completely across the same.

9. The method of forming expansion joints in the bottom and the side walls of a substantially rectangular sheet metal tray, consisting in forming the joints in sets extending crosswise of the tray and in spaced relation along the length of the tray, each set of joints being formed by clamping the tray walls on opposite sides of the portions to be provided with the joints and then displacing into the tray between the clamping means opposed portions of the side walls of the tray and the intervening portion of the bottom wall to an extent less than the width of the bottom wall, whereby the ends of said intervening portion are free to fold in response to the formation of the joints in the side walls to extend the side wall joints completely across said side walls, and allowing the clamped portions of the tray walls to move toward each other in response to the formation of the joints to avoid undue stretching of the sheet metal as the joints are formed.

GUY L. TINKHAM.